US010754647B2

(12) United States Patent
Godowski et al.

(10) Patent No.: US 10,754,647 B2
(45) Date of Patent: Aug. 25, 2020

(54) DYNAMIC SCHEDULING FOR A SCAN

(71) Applicant: International Business Machines Corporation, Armonk, NY (US)

(72) Inventors: Piotr P. Godowski, Cracow (PL); Piotr Kania, Cracow (PL); Michal Paluch, Cracow (PL); Tomasz Stopa, Cracow (PL)

(73) Assignee: International Business Machines Corporation, Armonk, NY (US)

(*) Notice: Subject to any disclaimer, the term of this patent is extended or adjusted under 35 U.S.C. 154(b) by 797 days.

(21) Appl. No.: 14/976,297

(22) Filed: Dec. 21, 2015

(65) Prior Publication Data

US 2017/0178008 A1 Jun. 22, 2017

(51) Int. Cl.
*G06F 9/30* (2018.01)
*G06F 9/00* (2006.01)
*G06F 8/71* (2018.01)
*G06N 3/02* (2006.01)

(52) U.S. Cl.
CPC .............. *G06F 9/30* (2013.01); *G06F 8/71* (2013.01); *G06N 3/02* (2013.01)

(58) Field of Classification Search
None
See application file for complete search history.

(56) References Cited

U.S. PATENT DOCUMENTS

| 7,506,038 | B1* | 3/2009 | Perrone | G06F 8/60 709/220 |
|---|---|---|---|---|
| 7,802,301 | B1 | 9/2010 | Dreyer et al. | |
| 7,979,530 | B1 | 7/2011 | Lee | |
| 8,407,669 | B2 | 3/2013 | Yee et al. | |
| 8,443,445 | B1 | 5/2013 | Andruss et al. | |
| 8,555,391 | B1 | 10/2013 | Demir et al. | |
| 8,595,839 | B2 | 11/2013 | Andrews et al. | |
| 8,631,014 | B2 | 1/2014 | Thomas et al. | |
| 9,619,778 | B2 | 4/2017 | Ruggeri et al. | |
| 2002/0104014 | A1* | 8/2002 | Zobel | G06F 21/577 726/26 |
| 2002/0194247 | A1* | 12/2002 | Caggese | G06Q 10/10 718/102 |
| 2006/0112061 | A1* | 5/2006 | Masurkar | G06F 11/0709 706/47 |

(Continued)

OTHER PUBLICATIONS

"Adjusting scans to improve computer performance", Symantec, Updated Sep. 22, 2014, Printed on: Jul. 14, 2015, 2 pages, <https://support.symantec.com/en_US/article.HOWTO81388.html>.

(Continued)

*Primary Examiner* — Li B. Zhen
*Assistant Examiner* — Markus A. Vasquez
(74) *Attorney, Agent, or Firm* — Stephen R. Yoder (57) ABSTRACT

In an approach for providing adaptive software inventory scan frequencies and schedules, a processor receives information from an initial scan of a set of software inventory scans, wherein the information includes at least one of: running processes, file system entries, registry entries, and software catalog evaluations. A processor analyzes the information from the initial scan. A processor predicts an outcome for future software inventory scans based on the analysis of the information, wherein the prediction includes a scanning frequency and a scanning schedule.

12 Claims, 4 Drawing Sheets

(56) References Cited

U.S. PATENT DOCUMENTS

| | | | |
|---|---|---|---|
| 2008/0168459 A1* | 7/2008 | Benedetti | G06F 9/5044 |
| | | | 718/104 |
| 2010/0250480 A1* | 9/2010 | Cherkasova | G06F 16/174 |
| | | | 706/47 |
| 2012/0216190 A1 | 8/2012 | Sivak | |
| 2017/0017521 A1* | 1/2017 | Gupta | G06F 9/5011 |

OTHER PUBLICATIONS

Godowski et al., "Dynamic Scheduling For a Scan", U.S. Appl. No. 16/747,154, filed Jan. 20, 2020, 28 pages.

IBM Appendix P, list of patents and patent applications treated as related, Filed Herewith, 2 pages.

* cited by examiner

DYNAMIC SCHEDULING FOR A SCAN

BACKGROUND OF THE INVENTION

The present invention relates generally to the field of software asset management (SAM), and more particularly to providing adaptive software inventory scan frequencies and schedules, based on environment dynamics.

SAM is a business practice that involves managing and optimizing the purchase, deployment, maintenance, utilization, and disposal of software applications within an organization. Fundamentally intended to be part of an organization's information technology (IT) business strategy, the goals of SAM are to reduce IT costs and limit business and legal risk related to the ownership and use of software, while maximizing IT responsiveness and end-user productivity.

SUMMARY

Aspects of an embodiment of the present invention disclose a method, computer program product, and computing system for providing adaptive software inventory scan frequencies and schedules. A processor receives information from an initial scan of a set of software inventory scans, wherein the information includes at least one of: running processes, file system entries, registry entries, and software catalog evaluations. A processor analyzes the information from the initial scan. A processor predicts an outcome for future software inventory scans based on the analysis of the information, wherein the prediction includes a scanning frequency and a scanning schedule.

DETAILED DESCRIPTION

Currently, software inventory scan frequency and schedule planning is problematic for Software Asset Management solution administrators. Embodiments of the present invention recognize that there is a compromise between performance/resource consumption and accuracy of software inventory. Embodiments of the present invention also recognize that adjustments of set scan schedules are time consuming and difficult to be done correctly in more dynamic environments. Embodiments of the present invention provide adaptive software inventory scan frequencies and schedules, based on environment dynamics.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
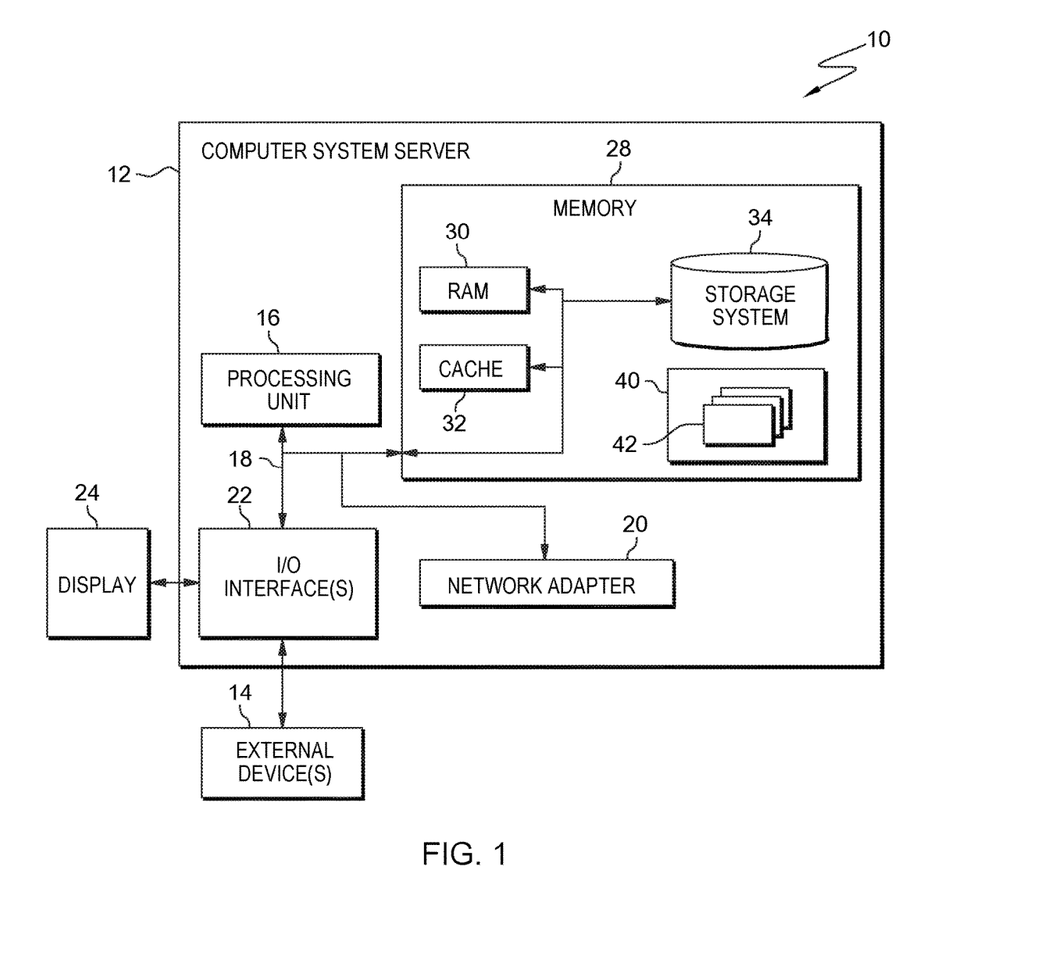
FIG. 1 depicts a block diagram according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
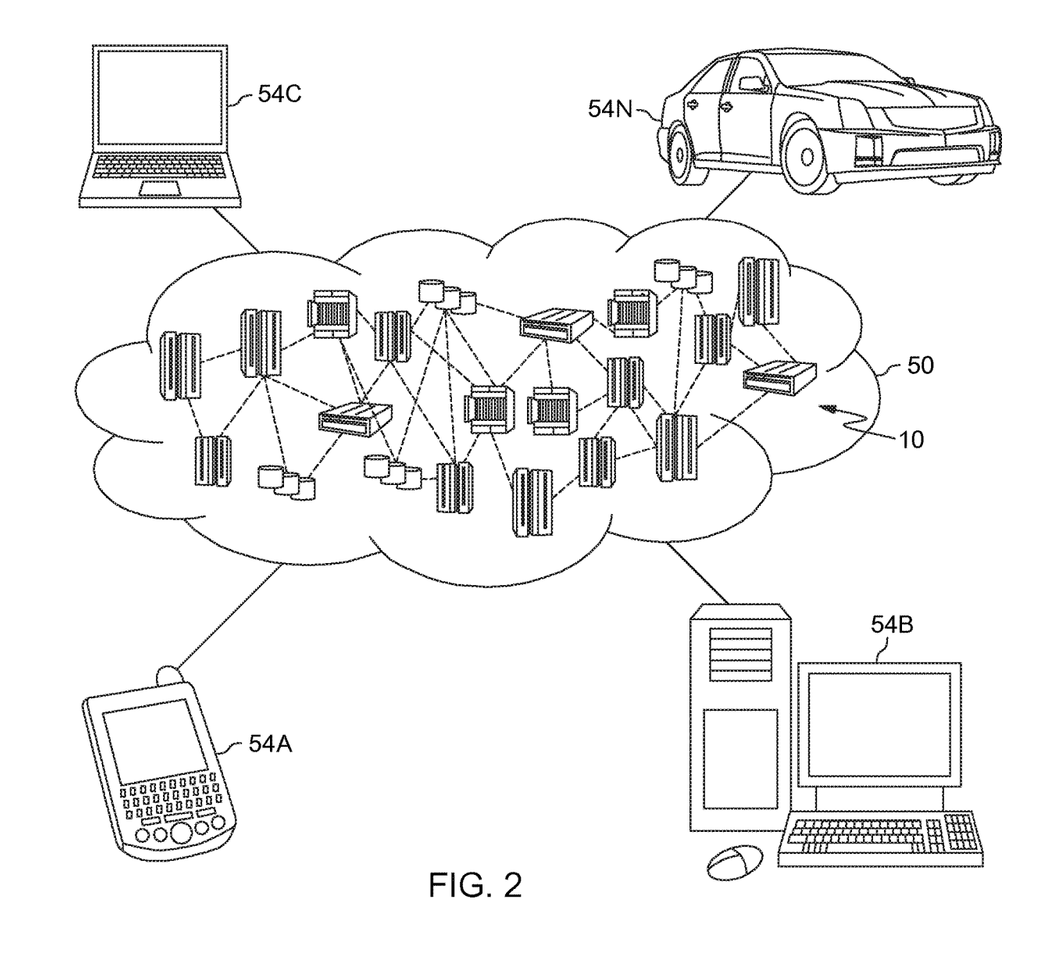
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
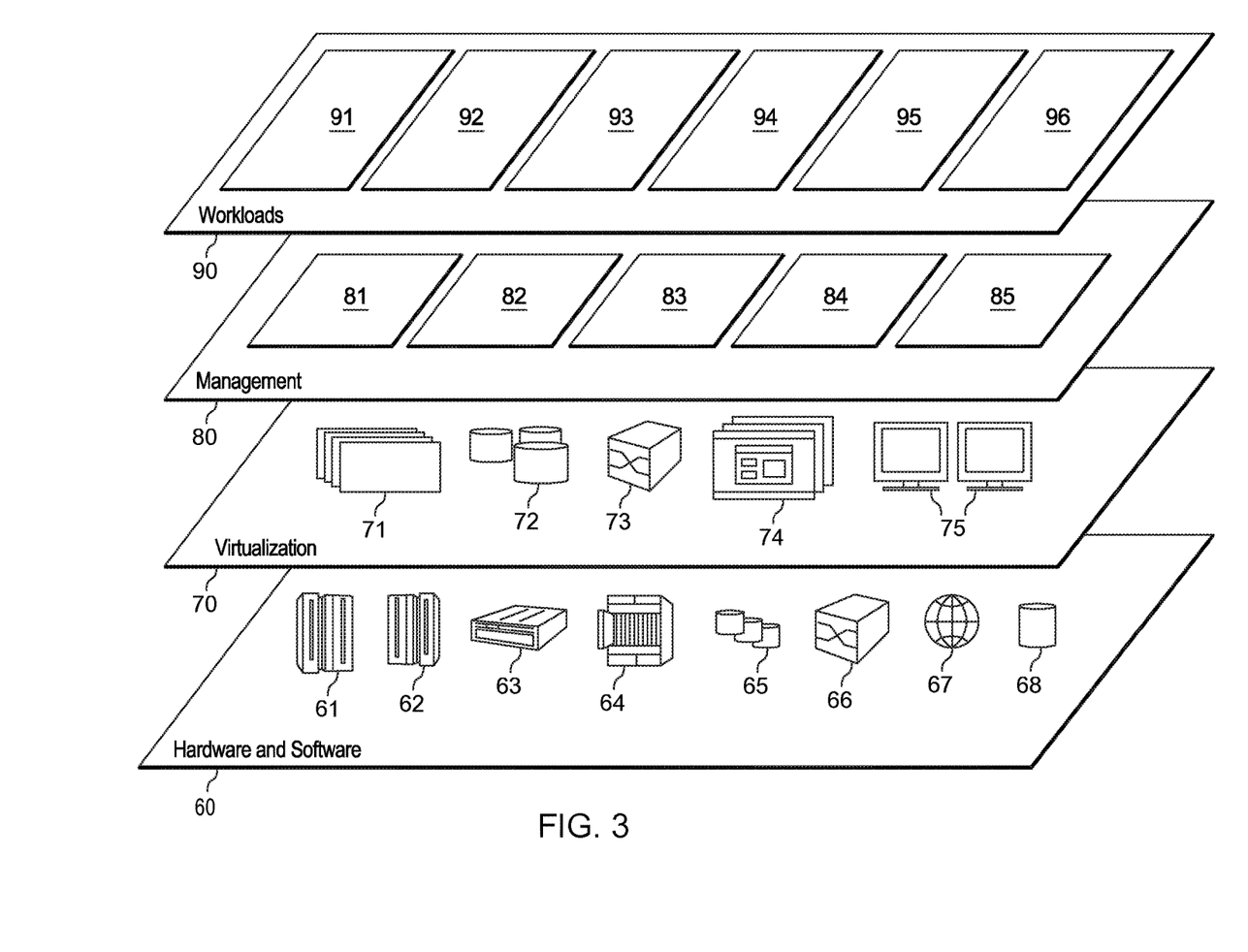
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and predicting program 96.

Figure 4:
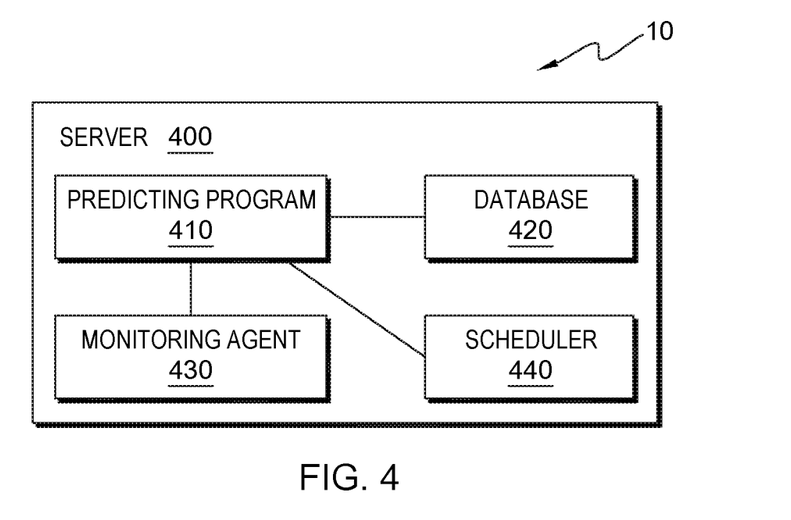
FIG. 4 depicts a block diagram of a computing system according to an embodiment of the present invention.

Referring now to FIG. 4, a diagram of a server 400 in cloud computing node 10 is shown, in accordance with one embodiment of the present invention. FIG. 4 provides an illustration of one embodiment and does not imply any limitations with regard to the environments in which different embodiments can be implemented.

In the depicted embodiment, server 400 contains predicting program 410, database 420, monitoring agent 430, and scheduler 440. Server 400 can include components as depicted and described in further detail with respect to FIG. 1.

Working within workloads layer 90 in FIG. 3, predicting program 410 operates to provide adaptive software inventory scan frequencies and schedules, based on environment dynamics. In doing so, predicting program 410 receives information from initial scans' results. Predicting program 410 analyzes the information from the initial scans' results. Predicting program 410 predicts outcome for future scans. Predicting program 410 implements the predictions. Predicting program 410 validates the accuracy of the implementation. In the depicted embodiment, predicting program 410 resides on server 400. In other embodiments, predicting program 410, or similar programs, can reside on another server or another computing device, provided that predicting program 410 has access to database 420, monitoring agent 430, and scheduler 440.

Database 420 can be a repository that can be written to and/or read by predicting program 410. In one embodiment, predicting program 410 can allow an administrator to define software inventory scan frequencies and schedules and store the software inventory scan frequencies and schedules to database 420. In some embodiments, database 420 can store software inventory scan frequencies and schedules that are defined within predicting program 410. In other embodiments, database 420 may be a knowledge base that is governed by an ontology. A knowledge base is a technology used to store complex structured and unstructured information used by a computer system. A knowledge-based system consists of a knowledge base that represents facts and an inference engine that can reason about those facts and use rules and other forms of logic to deduce facts or highlight inconsistencies. In some embodiments, information stored in a knowledge base may include: function categories; descriptions; services; service functions; capabilities and configurations; and WordNet (a lexical database for the English language). An ontology is a formal, explicit specification of a shared abstract simplified view of some selected part of the world, containing the objects, concepts, and other entities that are presumed of interest for some particular purpose and the relationships between them. In some embodiments, an ontology may use the information stored in a knowledge base to form and identify the relationships between various scans. In the depicted embodiment, database 420 resides on server 400. In other embodiments, database 420, or similar databases, can reside on another server or another computing device, provided that database 420 is accessible to predicting program 410.

Monitoring agent 430 is used to monitor machines within an environment that needs to be scanned. In one embodiment, monitoring agent 430 monitors various machines for a predetermined time period (e.g., one hour, one day, or one week). In other embodiments, monitoring agent 430 monitors various machines until predicting program 410 receives an alert that enough information has been received.

Scheduler 440 is used to schedule a scan. Scheduler 440 is also used to load balance and share system resources effectively or achieve a target quality of service (overall performance of a computer network). Scheduling is the method by which threads, processes, or data flows are given access to system resources—for example, processor time and/or communications bandwidth. The need for a scheduling algorithm arises from the requirement for most modern systems to perform multitasking (executing more than one process at a time) and multiplexing (transmitting multiple data streams simultaneously across a single physical channel). Scheduler 440 is concerned mainly with throughput, latency, granting equal central processing unit (CPU) time to each process, and the time each process remains in queue. The previously mentioned concerns often conflict, so scheduler 440 can implement a suitable compromise. The suitable compromise gives preference to any one of the concerns, depending on a user's needs and objectives. In the depicted embodiment, scheduler 440 resides on server 400. In other embodiments, scheduler 440 can reside on another server or another computing device, provided that scheduler 440 is accessible to predicting program 410.

Figure 5:
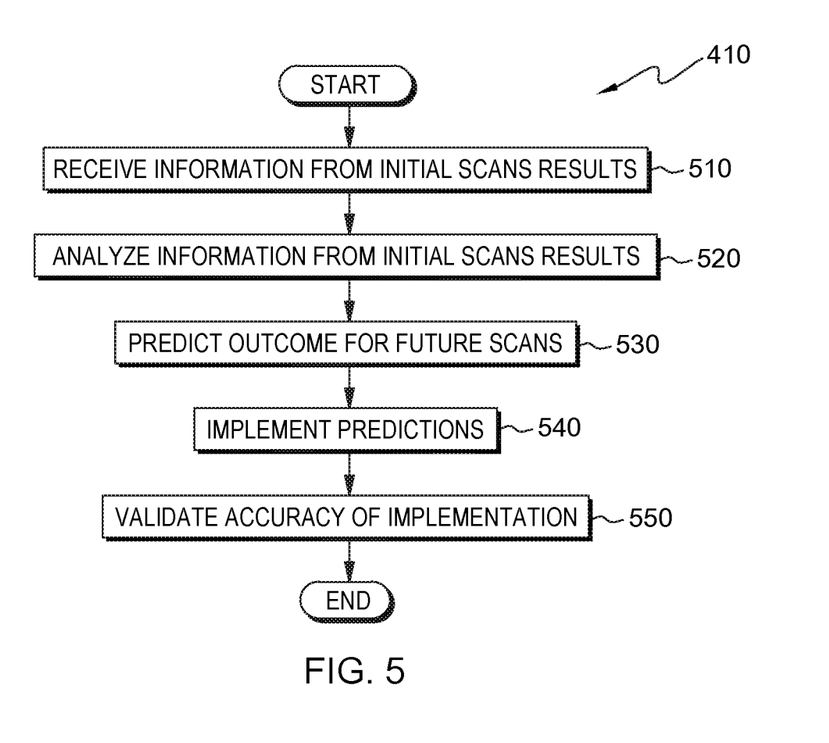
FIG. 5 depicts a flowchart of the steps of a predicting program, executing within the computing system of FIG. 4, for providing adaptive software inventory scan frequencies and schedules, based on environment dynamics.

Referring now to FIG. 5, a flowchart of the steps of a predicting program is shown, executing within the computing system of FIG. 4, in accordance with an embodiment of the present invention. Predicting program 410 operates to provide adaptive software inventory scan frequencies and schedules, based on environment dynamics. In some embodiments, the term "dynamic scheduling of a scan" refers to a scheduling of a scan that is characterized by frequent change, activity, or progress. Cloud-based environments are constantly changing; therefore, the scheduling of a scan has to be able to change as well.

In step 510, predicting program 410 receives information from initial scans' results. Software inventory discovery is based on the analysis of the results of a "software inventory scan." However, practically, a "software inventory scan" is a collection of several types of scans, which pull data from different sources from a scanned machine that are executed, one by one, at a scheduled time. Examples of scans include, but are not limited to: usage scans—list of running processes; raw scans—file system/registry entries; and catalog based scans—software catalog evaluation.

In one embodiment, predicting program 410 receives information from initial scans' results via monitoring agent 430. In other embodiments, predicting program 410 uses monitoring agent 430 to monitor machines for a predetermined time period (e.g., one hour, one day, or one week). In some embodiments, predicting program 410 uses monitoring agent 430 to monitor machines until predicting program 410 receives an alert that enough information has been received.

Embodiments of the present invention provide adaptive software inventory scan frequencies and schedules for different types of scans, based on environment dynamics, machine characteristics, and scanners interdependencies relevant for scanned machines. Predicting program 410 allows the frequency and schedule of a scan to adapt to specific machines, which depend on given factors and parameters. Additionally, predicting program 410 provides automated schedule time adjustments per source scan and keeps a dynamic balance between software inventory accuracy and resource consumption. Predicting program 410 utilizes neural network algorithms for determining software scan frequencies and schedules for various types of scans. In some embodiments, predicting program 410 uses existing initial scans' results for self-learning of customer environment specifics and adaptive evaluation of the schedule of future scans.

The neural network is trained with examples of software scan frequencies and schedules. In machine learning and cognitive science, artificial neural networks are a family of models inspired by biological neural networks and are used to estimate or approximate functions that can depend on a large number of inputs and are generally unknown. In one embodiment, predicting program 410 retrieves already existing initial scans' results with collected machine characteristics and scanners interdependencies from database 420. In other embodiments, predicting program 410 receives initial scans' results with collected machine characteristics and scanners interdependencies in real-time. A typical software scan schedule is made for each machine group based on location, operating system, or specification of computer, so an input vector for the neural network could be constructed in the following way:

| Data | Position in Vector |
|---|---|
| Scanner type ID | 1 |
| Schedule week of month | 2 |
| Schedule day of week | 3 |
| Schedule hour | 4 |
| Agent name represented by ASCII numbers and filled with 0 to have common length | 2-61 |
| Agent IP | 62-65 |
| Agent OS represented by ASCII numbers and filled with 0 to have common length | 66-125 |
| CPU speed in MPS | 126 |
| RAM capacity in MB | 127 |
| Disc capacity in MB | 128 |

In step 520, predicting program 410 analyzes the information from the initial scans' results. In one embodiment, predicting program 410 analyzes the information from the initial scans' results using vectors that contain the results from the initial scans, wherein each of such vectors in the learning phase will be labeled with scan results delta, discovered software delta, and CPU, random-access memory (RAM), and disc usage by scanning process. The vector will represent the outcome of the performed scan, which should balance between software inventory accuracy and resource consumption. An example is as follows:

| Data | Position in vector |
|---|---|
| Scan Delta comparison of the last and previous scan results, provided in % | 1 |
| Software Delta comparison of discovered software before and after the last scan, provided in % | 2 |
| Scan Duration | 3 |
| CPU Usage average CPU utilization by scanner in % of total capacity | 4 |
| RAM Usage average RAM utilization by scanner in % of total capacity | 5 |
| Disc Usage average disc consumption by scanner in % of total size | 6 |

In step 530, predicting program 410 predicts the outcome for future scans. As a result of the learning phase, predicting program 410 obtains neural network parameters and is able to predict the outcome for a proposed scan type, schedule, and target machine characteristics. In one embodiment, predicting program 410 predicts the outcome for future scans by using the received neural network parameters in real-time. In other embodiments, predicting program 410 predicts the outcome for future scans by using neural network parameters retrieved from database 420.

In step 540, predicting program 410 implements the predictions. In one embodiment, predicting program 410 implements the predictions in scheduler 440, which sets further scans frequency and schedule for systems. In other embodiments, predicting program 410 implements the predictions based on the outcome of previous learned scans. In some embodiments, the algorithm adapts to newly added systems, which would have characteristics in common with other machines.

In step 550, predicting program 410 validates the accuracy of the implementation. In one embodiment, predicting program 410 collects scan frequencies and schedules and stores the collected scan frequencies and schedules to database 420. In other embodiments, predicting program 410 validates the accuracy of the implementation, based on the collected scan frequencies and schedules in real-time. In some embodiments, predicting program 410 validates the accuracy of the implementation, based on retrieving scan frequencies and schedules from database 420. Still, in other embodiments, there is a predefined threshold that has to be crossed before predicting program 410 reiterates the learning phase with all of the latest scan results. An example of a predefined threshold is a scan duration that lasts one minute. In such an embodiment, when the outcome of a scan is more than one minute, predicting program 410 reiterates the learning phase with all of the latest scan results.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for adapting software inventory scans to predicted machine parameters, the method comprising:
   monitoring a plurality of machines within a networked computing environment for a period of time wherein initial software inventory scans are performed during the period of time including a usage scan, a raw scan, and a catalog-based scan, and wherein machine parameters of each machine of the plurality of machines are recorded;
   receiving, for each machine of the plurality of machines, a corresponding initial scan dataset, wherein each corresponding initial scan dataset includes running processes from the usage scans, file system entries and registry entries from the raw scans, software catalog evaluations from the catalog-based scans, and the machine parameters of a respectively corresponding machine;
   analyzing a first initial scan dataset by running, by one or more processors, a neural network process using an input vector having a first scanning frequency and a first scanning schedule; and
   predicting, for the machine corresponding to the first initial scan dataset and using the neural network process, an outcome for a future usage scan based on the analysis of the first initial scan dataset, wherein the outcome includes a vector comprising measurements of the scan duration, a system utilization of the scanning process, and a comparison of discovered software before and after the future usage scan provided as a percent; and
   setting, based on the predicted outcome, a scan frequency and a scan schedule for the periodic software inventory scans.

2. The method of claim 1, further comprising:
   causing, by one or more processors, a first periodic software inventory scan to be performed subsequent to setting the scan frequency and the scan schedule; and
   validating an accuracy of the first periodic software inventory scan, based on the predicted outcome.

3. The method of claim 2, wherein validating the accuracy of the first software inventory scan comprises:
   validating an accuracy of implementing the predicted outcome for the first periodic software inventory scan, based on a predefined threshold, wherein the predefined threshold includes a usage scan duration.

4. The method of claim 1, further comprising:
   analyzing each corresponding initial scan dataset for customer environment information;
   wherein:
   predicting the outcome for a future usage scan is further based on the customer environment information.

5. A computer program product for adapting software inventory scans to predicted machine parameters, the computer program product comprising:
   one or more computer readable storage media and program instructions stored on the one or more computer readable storage media, the program instructions comprising:
   program instructions to monitor a plurality of machines within a networked computing environment for a period of time wherein initial software inventory scans are performed during the period of time including a usage scan, a raw scan, and a catalog-based scan, and wherein machine parameters of each machine of the plurality f machines are recorded;
   program instructions to receive, for ach machine of the plurality of machines, a corresponding initial scan dataset, wherein each corresponding initial scan dataset includes running processes from the usage scans, file system entries and registry entries from the raw scans, software catalog evaluations from the catalog-based scans, and the machine parameters of a respectively corresponding machine;
   program instructions to analyze a first initial scan dataset by running, by one or more processors, a neural network process using input vector having a first scanning frequency and a first scanning schedule; and
   program instructions to predict, for the machine corresponding to the first initial scan dataset and using the neural network process, an outcome for a future usage scan based on the analysis of the first initial scan dataset, wherein the outcome includes a vector comprising measurements of the scan duration, a system utilization of the scanning process, and a comparison of discovered software before and after the future usage scan provided as a percent; and
   setting, based on the predicted outcome, a scan frequency arid a scan schedule for the periodic software inventory scans.

6. The computer program product of claim 5, the program instructions further comprising:
   program instructions to cause a first periodic software inventory scan to be performed subsequent to setting the scan frequency and the scan schedule; and program instructions to validate an accuracy of the first periodic software inventory scan, based on the predicted outcome.

7. The computer program product of claim 6, wherein program instructions to validate the accuracy of the first software inventory scan comprise:
   program instructions to validate an accuracy of implementing the predicted outcome for the first periodic software inventory scan, based on a predefined threshold, wherein the predefined threshold includes a usage scan duration.

8. The computer program product of claim 5, the program instructions further comprising:
   program instructions to analyze each corresponding initial scan dataset for customer environment information; wherein:
   predicting the outcome for a future usage scan is further based on the customer environment information.

9. A computer cyst in for adapting software inventory scans to predicted machine parameters, the computer system comprising:
   one or more computer processors, one or more computer readable storage media, and program instructions stored on the computer readable storage media for execution by at least one of the one or more processors, the program instructions comprising:
   program instructions to monitor a plurality of machines within a networked computing environment for a period of time wherein initial software inventory scans are performed during the period of time including a usage scan, a raw scan, and a catalog-based scan, and wherein machine parameters of each machine of the plurality of machines are recorded;
   program instructions to receive, for each machine of the plurality of machines, a corresponding initial scan dataset, wherein each corresponding initial scan dataset includes running processes from the usage scans, file system entries and registry entries from the raw scans, software catalog evaluations from the catalog-based scans, and the machine parameters of a respectively corresponding machine;
   program instructions to analyze a first initial scan dataset by running, by one or more processors, a neural network process using input vector having a first scanning frequency and a first scanning schedule; and
   program instructions to predict, for the machine corresponding to the first initial scan dataset and using the neural network process, an outcome for a future usage scan based on the analysis of the first initial scan dataset, wherein the outcome includes a vector comprising measurements of the scan duration, a system utilization of the scanning process, and a comparison of discovered software before and after the future usage scan provided as a percent; and
   setting, based on the predicted outcome, a scan frequency and a scan schedule for the periodic software inventory scans.

10. The computer system of claim 9, the program instructions further comprising:
    program instructions to cause a first periodic software inventory scan to be performed subsequent to setting the scan frequency and the scan schedule; and
    program instructions to validate an a curacy of the first periodic software inventory scan, based on the predicted outcome.

11. The computer s tem of claim 10, wherein program instructions to validate the accuracy of the first software inventory scan comprise:
    program instructions to validate an accuracy of implementing the predicted outcome for the periodic software inventory scan, based on a predefined threshold, wherein the predefined threshold includes a usage scan duration.

12. The computer system of claim 9, the program instructions further comprising:
    program instructions to analyze each corresponding initial scan dataset for customer environment information; wherein:
    predicting the outcome for a future usage scan is further based on the customer environment information.

* * * * *